United States Patent
Kim et al.

(10) Patent No.: US 12,151,558 B2
(45) Date of Patent: Nov. 26, 2024

(54) APPARATUS AND METHOD FOR CONTROLLING HUD OF VEHICLE

(71) Applicants: HYUNDAI MOTOR COMPANY, Seoul (KR); Kia Corporation, Seoul (KR)

(72) Inventors: Ju Hyuk Kim, Suwon-si (KR); Hui Won Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 280 days.

(21) Appl. No.: 17/752,225

(22) Filed: May 24, 2022

(65) Prior Publication Data

US 2023/0150360 A1    May 18, 2023

(30) Foreign Application Priority Data

Nov. 15, 2021    (KR) .................... 10-2021-0156932

(51) Int. Cl.
*B60K 35/00*    (2024.01)
*B60K 35/23*    (2024.01)
(Continued)

(52) U.S. Cl.
CPC .............. *B60K 35/00* (2013.01); *B60K 35/23* (2024.01); *B60K 35/28* (2024.01); *B60K 35/29* (2024.01);
(Continued)

(58) Field of Classification Search
CPC ........ B60K 35/00; B60K 35/28; B60K 35/23; B60K 2360/1868; B60K 2360/166; B60K 35/29; B60K 2360/334; B60K 2360/177
See application file for complete search history.

(56) References Cited

U.S. PATENT DOCUMENTS 11,049,320 B2    6/2021   Jan Wyszka et al.
2016/0327402 A1*  11/2016  Funabiki .............. G08G 1/0969
(Continued)

FOREIGN PATENT DOCUMENTS

KR         20180063688 A  *  6/2018
KR      10-2018-0093829 A     8/2018
(Continued)

OTHER PUBLICATIONS

English translation of KR 20180063688 A (Year: 2018).*
English translation of WO-2020166252-A1 (Year: 2020).*

*Primary Examiner* — Anshul Sood
*Assistant Examiner* — Matthew Ho
(74) *Attorney, Agent, or Firm* — MORGAN, LEWIS & BOCKIUS LLP

(57) ABSTRACT

An apparatus for controlling a head up display of a vehicle includes a navigation device that calculates a residual distance from a position of the vehicle to a driving direction change point, a display that displays vehicle information as an augmented reality image, and a controller that compares the residual distance with a preset distance, determines whether to correct the residual distance depending on a result of the comparison, corrects the residual distance based on an output height of the augmented reality image when correcting the residual distance, and sets a position spaced apart by the corrected residual distance from the position of the vehicle as a projected position of the augmented reality image.

11 Claims, 7 Drawing Sheets

(51) Int. Cl.
  *B60K 35/28* (2024.01)
  *B60K 35/29* (2024.01)
(52) U.S. Cl.
  CPC .. *B60K 2360/166* (2024.01); *B60K 2360/177* (2024.01); *B60K 2360/1868* (2024.01); *B60K 2360/334* (2024.01)

(56) References Cited

U.S. PATENT DOCUMENTS

| | | |
|---|---|---|
| 2018/0232956 A1 | 8/2018 | Jan Wyszka et al. |
| 2020/0035012 A1 | 1/2020 | Mullins et al. |
| 2020/0152065 A1* | 5/2020 | Hada ................. G01C 21/3602 |
| 2021/0197669 A1 | 7/2021 | Jeong et al. |
| 2021/0208392 A1 | 7/2021 | Jeong et al. |
| 2023/0073556 A1* | 3/2023 | Minami ................. G09G 3/001 |

FOREIGN PATENT DOCUMENTS

| | | | |
|---|---|---|---|
| KR | 10-2021-0009397 A | 1/2021 | |
| WO | WO-2020166252 A1 * | 8/2020 | ............. B60K 35/00 |

* cited by examiner

APPARATUS AND METHOD FOR CONTROLLING HUD OF VEHICLE

CROSS-REFERENCE TO RELATED APPLICATION

The present application claims the benefit of priority to Korean Patent Application No. 10-2021-0156932, filed on Nov. 15, 2021 in the Korean Intellectual Property Office, the entire contents of which are incorporated herein by reference.

TECHNICAL FIELD

The present disclosure relates to an apparatus and a method for controlling a head up display (HUD) of a vehicle.

BACKGROUND

A head up display (an HUD) refers to a device that displays various vehicle information including driving direction information that guides a route according to a position of a vehicle in conjunction with a navigation device and a speed on a windshield glass or in front of the vehicle over the windshield glass as an augmented reality image.

However, since the vehicle information displayed through the head up display is linked with the navigation device, there is a limitation in that the augmented reality image cannot be displayed at an accurate position when an error in position information of the vehicle occurs. For example, a residual distance up to the actual driving direction change point of the vehicle may be different from the residual distance calculated by the navigation device due to the error in the position information of the vehicle. In this case, the augmented reality image that guides the driving direction change point of the vehicle is not displayed at an actual driving direction change point of the vehicle, and is displayed at a point ahead of the driving direction change point of the vehicle. Accordingly, it is difficult to provide accurate vehicle information to a driver.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An embodiment of the present disclosure is to provide an apparatus and a method for controlling a head up display of a vehicle capable of displaying vehicle information as an augmented reality image at an accurate position in consideration of a case where a vehicle position error occurs.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a head up display of a vehicle, which includes a navigation device that calculates a residual distance from a position of the vehicle to a driving direction change point, a display that displays vehicle information as an augmented reality image, and a controller that compares the residual distance with a preset distance, determines whether to correct the residual distance depending on a result of the comparison, corrects the residual distance based on an output height of the augmented reality image when correcting the residual distance, and sets a position spaced apart by the corrected residual distance from the position of the vehicle as a projected position of the augmented reality image.

In an exemplary embodiment, the controller may receive the residual distance from the navigation device.

In an exemplary embodiment, the controller may start projecting the vehicle information as the augmented reality image at a point spaced apart by the preset distance from the position of the vehicle when the residual distance is determined to be the preset distance.

In an exemplary embodiment, the controller may determine to correct the residual distance when the residual distance from the position of the vehicle received from the navigation device to the driving direction change point of the vehicle is determined to be less than the preset distance.

In an exemplary embodiment, the controller may correct the residual distance by adding a preset projected distance corresponding to the output height of the augmented reality image to the residual distance.

In an exemplary embodiment, the controller may control to end the display after displaying the augmented reality image at a position spaced apart by the projected distance from the position of the vehicle when the corrected residual distance is the projected distance.

According to an aspect of the present disclosure, a method for controlling a head up display of a vehicle includes receiving a residual distance from a position of the vehicle to a driving direction change point, comparing the residual distance with a preset distance, and determining whether to correct the residual distance depending on a result of the comparison, and correcting the residual distance based on an output height of the augmented reality image when correcting the residual distance, and setting a position spaced apart by the corrected residual distance from the position of the vehicle as a projected position of the augmented reality image.

In an exemplary embodiment, the method may further include starting to project the vehicle information as the augmented reality image at a point spaced apart by the preset distance from the position of the vehicle when the residual distance is determined to be the preset distance.

In an exemplary embodiment, the determining of the whether to correct the residual distance may include determining to correct the residual distance when the residual distance from the position of the vehicle to the driving direction change point of the vehicle is determined to be less than the preset distance.

In an exemplary embodiment, the correcting of the residual distance may include correcting the residual distance by adding a preset projected distance corresponding to the output height of the augmented reality image to the residual distance. In an exemplary embodiment, the method may further include controlling to end a projection after projecting the augmented reality image at a position spaced apart by the projected distance from the position of the vehicle when the corrected residual distance is the projected distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
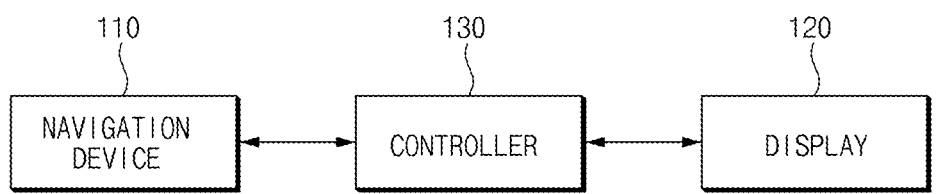
FIG. 1 is a diagram illustrating a configuration of an apparatus for controlling a head up display of a vehicle according to an exemplary embodiment of the present disclosure.

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of an apparatus for controlling a head up display of a vehicle according to an exemplary embodiment of the present disclosure.

Referring to FIG. 1, an apparatus 100 for controlling a head up display of a vehicle according to an exemplary embodiment of the present disclosure may include a navigation device 110, a display 120, and a controller 130.

The navigation device 110 may be provided with a GPS receiver to receive the current position of the vehicle. The navigation device 110 may provide map information and route guidance information to a destination based on the current position of the vehicle. According to an exemplary embodiment, the navigation device 110 may provide a route to a destination including at least one driving direction change point. The navigation device 110 may calculate the residual distance from the current position of the vehicle to the driving direction change point. In addition, the navigation device 110 may provide driving direction information at least one driving direction change point.

The display 120 may project the augmented reality image to the front of the vehicle by outputting the augmented reality image to the windshield of the vehicle in an AR (augmented reality) head up display method. In this case, the augmented reality image may include vehicle information. In this case, the vehicle information may include the current speed, information provided by the navigation device 110, time, external temperature, fuel remaining, and the like.

The display 120 may include a projection device that generates the augmented reality image. The augmented reality image generated by the projection device may be reflected by a mirror, may be output to the windshield, and may be projected to the front of the vehicle. The display 120 may adjust the output height of the augmented reality image output to the windshield by adjusting the angle of the mirror under the control of the controller 130, and the distance projected to the front of the vehicle according to the output height of the augmented reality image may be adjusted. A more detailed description will be described with reference to FIG. 2. According to an exemplary embodiment, the output height may be preset by a driver, and may be determined by the controller 130 in consideration of the driver's condition (an eye level, etc.).

Figure 2:
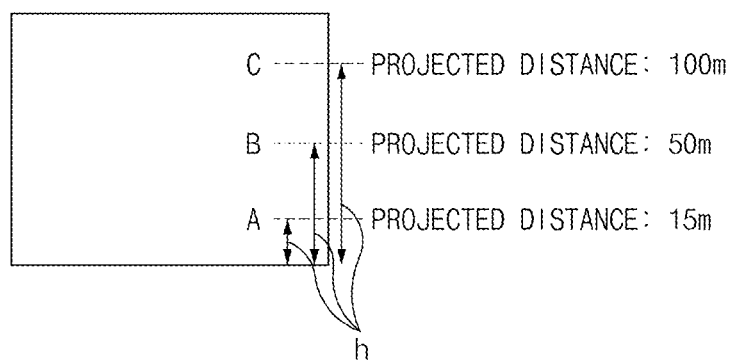
FIG. 2 is a diagram schematically illustrating a projected distance according to a height at which an augmented reality image is displayed, according to an exemplary embodiment of the present disclosure.

FIG. 2 is a diagram schematically illustrating a projected distance according to a height at which an augmented reality image is displayed, according to an exemplary embodiment of the present disclosure.

As illustrated in FIG. 2, when the display 120 adjusts an angle of a mirror under the control of the controller 130 to set an output height (h) of the augmented reality image to the windshield as 'A', the display 120 may allow the augmented reality image to be projected at a point 15 m in front of the vehicle. In addition, when the display 120 sets the output height (h) of the augmented reality image to the windshield as 'B', the display 120 may allow the augmented reality image to be projected at a point 50 m in front of the vehicle. In addition, when the output height (h) of the augmented reality image to the windshield is set as 'C', the display 120 may allow the augmented reality image to be projected at a point 100 m in front of the vehicle. That is, the display 120 may allow the augmented reality image to be projected at a preset projected distance depending on the output height of the augmented reality image to the windshield. The display 120 may allow the augmented reality image to be projected at a point closer to the vehicle as the output height of the augmented reality image is lower, and may allow the augmented reality image to be projected at a point farther from the vehicle as the output height of the augmented reality image is higher.

The controller 130 may include various processing devices such as a microprocessor in which a semiconductor chip capable of performing operations or execution of various commands is embedded, and may control an operation of an apparatus for controlling the head up display of a vehicle according to an exemplary embodiment of the present disclosure.

The controller 130 may receive the residual distance (the residual distance from the position of the vehicle to the driving direction change point) from the navigation device 110.

The controller 130 may compare the residual distance with a preset distance, and determine whether to correct the residual distance based on the comparison result.

According to an exemplary embodiment, when it is determined that the residual distance is a preset distance, the controller 130 may allow the vehicle information to be displayed as the augmented reality image at a point where the residual distance is spaced apart from the position of the vehicle. In this case, the preset distance may include a preset distance to output the augmented reality image. For example, the preset distance may be 100 m.

According to another exemplary embodiment, when it is determined that the residual distance is less than the preset distance, the controller 130 may correct the residual distance. The controller 130 may correct the residual distance by adding a preset projected distance corresponding to the output height of the augmented reality image to the residual distance. In this case, the projected distance preferably has a length smaller than the width of a road. For example, the projected distance may be set to a maximum of 15 m.

For example, when it is assumed that the residual distance from the position of the vehicle to the driving direction change point is 85 m and the preset projected distance corresponding to the output height of the augmented reality image is 15 m, the controller 130 may correct the residual distance by adding the projected distance to the distance (85 m+15 m), and may set a position spaced apart by the corrected residual distance from the vehicle position as the projection position of the augmented reality image.

Therefore, even when the distance from the actual position of the vehicle to the driving direction change point is different from the residual distance calculated due to an error of the navigation device 110, the controller 130 may allow the augmented reality image to be projected by reflecting the preset projected distance corresponding to the output height of the augmented reality image, thereby accurately projecting the vehicle information at the driving direction change point of the vehicle.

In detail, when the residual distance is less than the preset distance, the controller 130 does not set the projection position of the augmented reality image based on the residual distance calculated by the navigation device 110, but may correct the residual distance by reflecting the preset projected distance corresponding to the output height of the augmented reality image. Accordingly, when the residual distance calculated by the navigation device 110 is actually shorter than the distance from the position of the vehicle to the driving direction change point of the vehicle, the controller 130 may allow the augmented reality image not to be projected at a point according to the residual distance calculated by the navigation device 110 ahead of the point where the actual driving direction needs to be changed, and the controller 130 may allow the augmented reality image to be projected at a point close to the point where the actual driving direction needs to be changed by reflecting the projected distance. Accordingly, the controller 130 may prevent confusion to the driver.

On the other hand, according to an exemplary embodiment of the present disclosure, even when the residual distance calculated by the navigation device 110 is not different from the actual vehicle position to the driving direction change point of the vehicle, the controller 130 may correct the residual distance when the residual distance is less than the preset distance. That is, even when an error of the navigation device 110 does not occur and the calculated residual distance is actually the same as the distance from the vehicle's position to the vehicle's driving direction change point, the controller 130 may correct the residual distance when the residual distance is less than the preset distance. In this case, the controller 130 may allow the augmented reality image to be projected at a point spaced apart by a projected distance from the driving direction change point of the vehicle. Therefore, since the point where the augmented reality image is projected does not deviate from the road to be driven after the vehicle's driving direction is changed, the augmented reality image may be projected without causing confusion to the driver.

When the distance from the vehicle to the driving direction change point decreases as the vehicle travels, and the corrected residual distance becomes the projected distance, the controller 130 may control to end the projection after projecting the augmented reality image at a position spaced apart by a preset projected distance corresponding to the output height of the augmented reality image from the position of the vehicle. In this case, when the corrected residual distance is a preset projected distance corresponding to the output height of the augmented reality image, the residual distance calculated by the navigation device 110 is 0 m. Accordingly, the controller 130 may allow the projection to be ended after projecting the augmented reality image to a position spaced apart by a preset projected distance corresponding to the output height of the augmented reality image from the position of the vehicle.

A more detailed description will be described with reference to FIGS. 3, 4, and 5.

Figure 3:
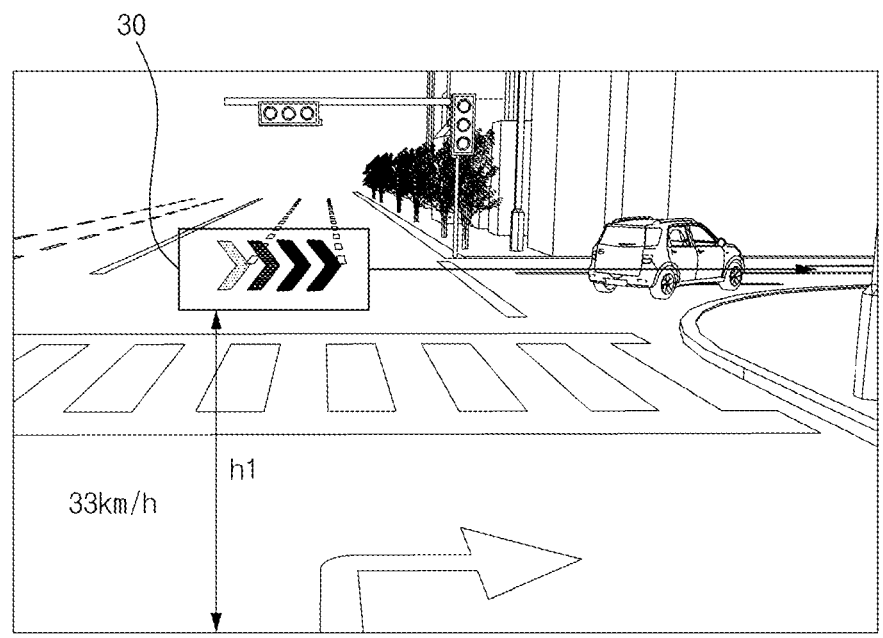
FIGS. 3, 4, and 5 are diagrams illustrating augmented reality images displayed according to an exemplary embodiment of the present disclosure.
Figure 4:
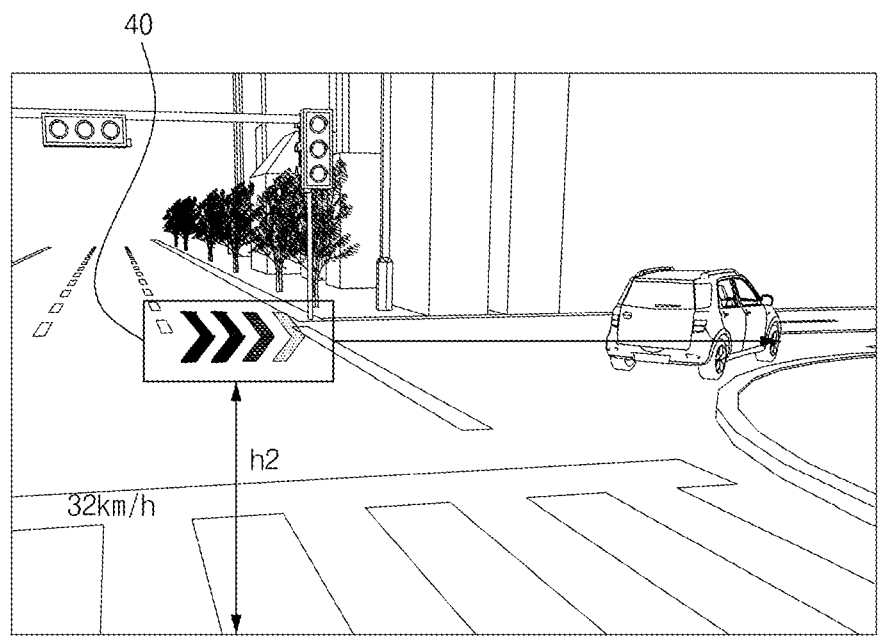
Figure 5:
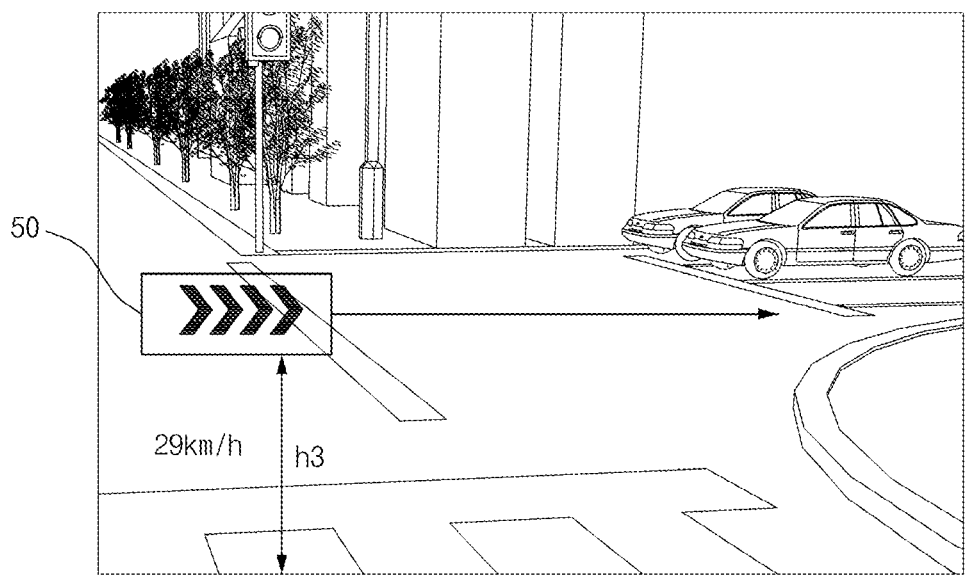

FIGS. 3, 4, and 5 are diagrams illustrating augmented reality images displayed according to an exemplary embodiment of the present disclosure.

As illustrated in FIG. 3, when it is assumed that the preset projected distance corresponding to the output height of the augmented reality image is 15 m, and the residual distance from the position of the vehicle calculated by the navigation device 110 to the driving direction change point is 15 m, the controller 130 may allow an augmented reality image 30 to be projected at output height (h1) corresponding to a point 30 m ahead from the position of the vehicle.

As illustrated in FIG. 4, when it is assumed that the preset projected distance corresponding to the output height of the augmented reality image is 15 m, and the residual distance from the position of the vehicle calculated by the navigation device 110 to the driving direction change point is 5 m, the controller 130 may allow an augmented reality image 40 to be projected at output height (h2) corresponding to a point 20 m ahead from the position of the vehicle.

As illustrated in FIG. 5, when it is assumed that the preset projected distance corresponding to the output height of the augmented reality image is 15 m, and the residual distance from the position of the vehicle calculated by the navigation device 110 to the driving direction change point is 0 m, the controller 130 may allow an augmented reality image 50 to be projected at output height (h3) corresponding to a point 15 m ahead from the position of the vehicle, and may allow the projection to be ended.

Figure 6:
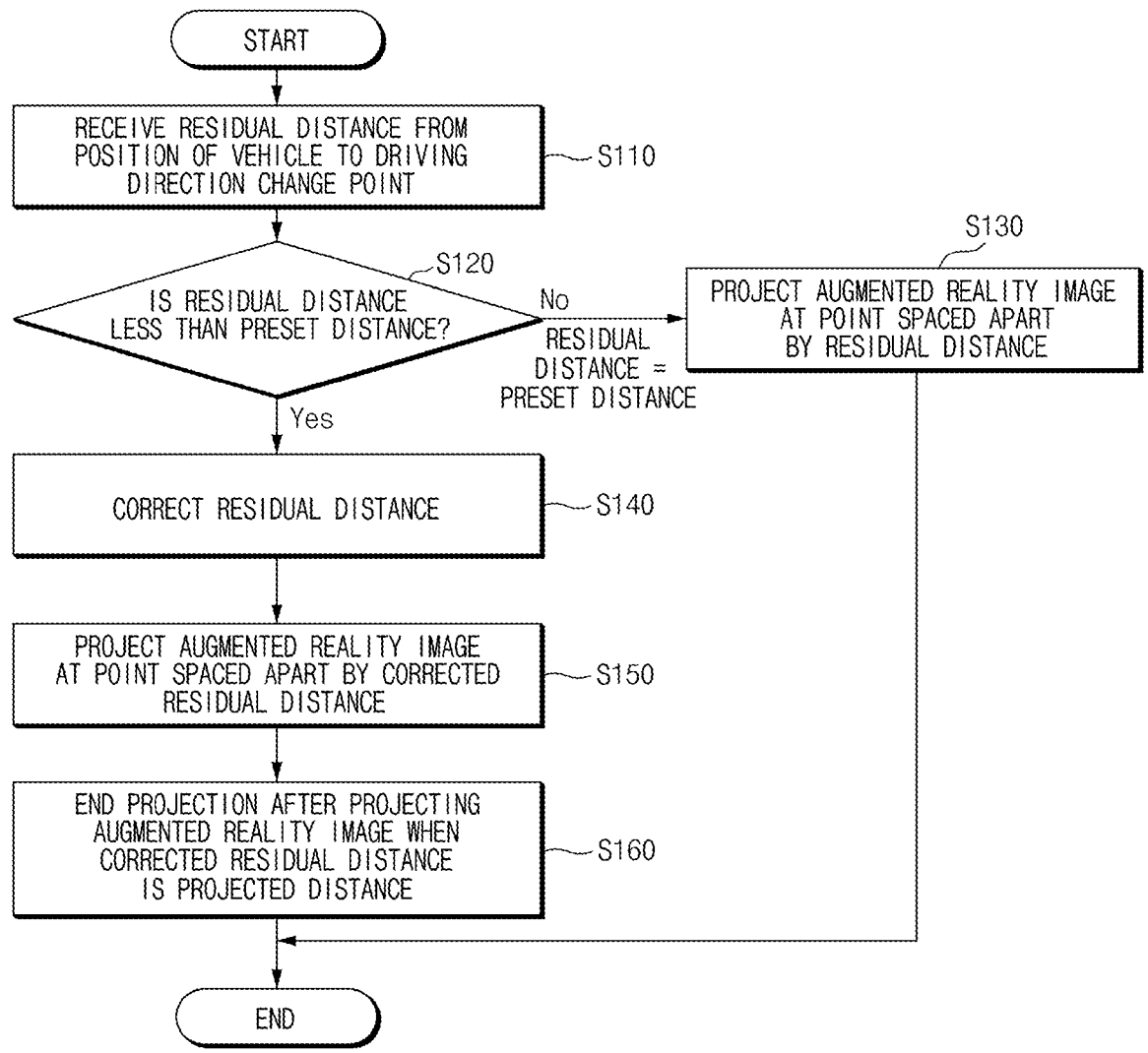
FIG. 6 is a flowchart illustrating a method for controlling a head up display of a vehicle according to an exemplary embodiment of the present disclosure.

FIG. 6 is a flowchart illustrating a method for controlling a head up display of a vehicle according to an exemplary embodiment of the present disclosure.

As illustrated in FIG. 6, the controller 130 may receive the residual distance from the position of the vehicle to the driving direction change point from the navigation device 110 (S110).

The controller 130 may determine whether the residual distance is less than a preset distance (S120). When it is determined that the residual distance is the preset distance in S120 (N), the controller 130 may allow the vehicle information to be projected as the augmented reality image at a point where the residual distance is spaced apart from the position of the vehicle (S130). In this case, the preset distance may include a preset distance to output the augmented reality image. For example, the preset distance may be 100 m.

When it is determined that the residual distance is less than the preset distance in S120 (Y), the controller 130 may correct the residual distance (S140). In S140, the controller 130 may correct a residual distance by adding a preset projected distance corresponding to the output height of the augmented reality image to the residual distance. In this case, the projected distance preferably has a length less than the width of a road. For example, the projected distance may be set to a maximum of 15 m.

As an example, when it is assumed that the residual distance from the position of the vehicle to the driving direction change point is 85 m, and the preset projected distance corresponding to the output height of the augmented reality image is 15 m, the controller 130 may correct the residual distance by adding the projected distance to the residual distance (85 m+15 m), and may allow the augmented reality image to be projected at a position spaced apart by the corrected residual distance from the position of the vehicle (S150).

Therefore, even when the distance from the actual vehicle position to the driving direction change point is different from the residual distance calculated due to an error of the navigation device 110, the controller 130 may allow the augmented reality image to be projected by reflecting the preset projected distance corresponding to the output height of the augmented reality image, so that the vehicle information is accurately projected at the driving direction change point of the vehicle.

That is, when the residual distance is less than the preset distance, the controller 130 does not set the projection position of the augmented reality image based on the residual distance calculated by the navigation device 110, but may correct the residual distance by reflecting the preset projected distance. corresponding to the output height of the augmented reality image. Accordingly, when the residual distance calculated by the navigation device 110 is actually shorter than the distance from the position of the vehicle to the driving direction change point of the vehicle, the controller 130 may allow the augmented reality image not to be projected at a point according to the residual distance calculated by the navigation device 110 ahead of the point where the actual driving direction needs to be changed, and the controller 130 may allow the augmented reality image to be projected at a point close to the point where the actual driving direction needs to be changed by reflecting the projected distance. Accordingly, the controller 130 may prevent confusion to the driver.

When the corrected residual distance is the projected distance, the controller 130 may allow the augmented reality image to be projected at a position spaced apart by a preset projected distance corresponding to the output height of the augmented reality image from the position of the vehicle, and then allow the projection to be ended (S160). In this case, when the corrected residual distance is a preset projected distance corresponding to the output height of the augmented reality image, the residual distance calculated by the navigation device 110 is 0 m. Accordingly, the controller 130 may allow the augmented reality image to be projected at a position spaced apart from the vehicle position by a preset projected distance corresponding to the output height of the augmented reality image, and then allow the projection to be ended.

Figure 7:
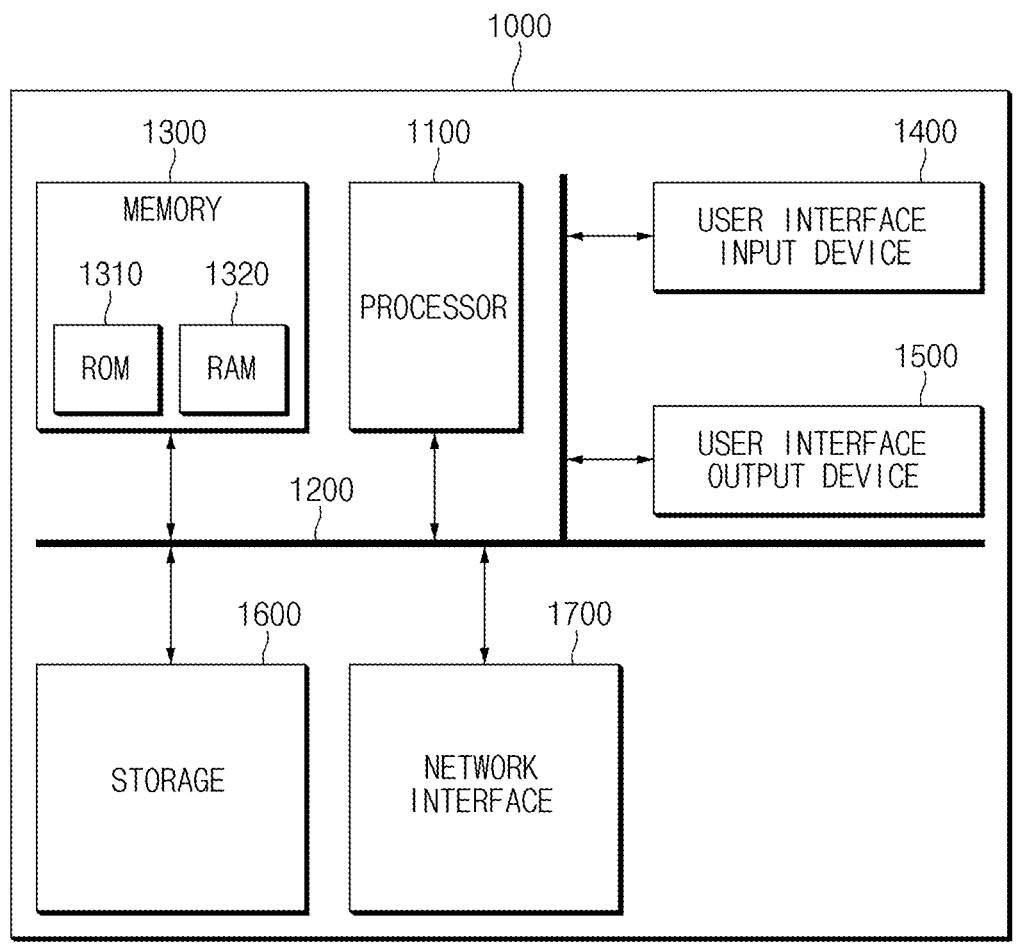
FIG. 7 is a diagram illustrating a configuration of a computing system executing a method according to an exemplary embodiment of the present disclosure.

FIG. 7 is a diagram illustrating a configuration of a computing system executing a method according to an exemplary embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to various embodiments of the present disclosure, an apparatus and a method for controlling a head up display of a vehicle may provide safe driving to a driver by displaying vehicle information as an augmented reality image at an accurate position in consideration of a case in which a vehicle position error occurs.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling a head up display of a vehicle, the apparatus comprising:
   a navigation device configured to calculate a residual distance from a position of the vehicle to a driving direction change point;
   a display configured to display vehicle information as an augmented reality image; and
   a controller configured to compare the residual distance with a preset distance, to determine whether to correct the residual distance depending on a result of the comparison, to correct the residual distance based on an output height of the augmented reality image when correcting the residual distance, and to set a position spaced apart by the corrected residual distance from the position of the vehicle as a projected position of the augmented reality image, wherein the output height of the augmented reality image is preset by a driver.

2. The apparatus of claim 1, wherein the controller receives the residual distance from the navigation device.

3. The apparatus of claim 1, wherein the controller starts projecting the vehicle information as the augmented reality image at a point spaced apart by the preset distance from the position of the vehicle when the residual distance is determined to be the preset distance.

4. The apparatus of claim 3, wherein the controller determines to correct the residual distance when the residual distance from the position of the vehicle received from the navigation device to the driving direction change point of the vehicle is determined to be less than the preset distance.

5. The apparatus of claim 1, wherein the controller corrects the residual distance by adding a preset projected distance corresponding to the output height of the augmented reality image to the residual distance.

6. The apparatus of claim 5, wherein the controller controls to end the display after displaying the augmented reality image at a position spaced apart by the preset projected distance from the position of the vehicle when the corrected residual distance is the preset projected distance.

7. A method for controlling a head up display of a vehicle, the method comprising:
receiving a residual distance from a position of the vehicle to a driving direction change point;
comparing the residual distance with a preset distance, and determining whether to correct the residual distance depending on a result of the comparison; and
correcting the residual distance based on an output height of an augmented reality image when correcting the residual distance, and setting a position spaced apart by the corrected residual distance from the position of the vehicle as a projected position of the augmented reality image,
wherein the output height of the augmented reality image is preset by a driver.

8. The method of claim 7, further comprising:
starting to project the vehicle information as the augmented reality image at a point spaced apart by the preset distance from the position of the vehicle when the residual distance is determined to be the preset distance.

9. The method of claim 8, wherein the determining whether to correct the residual distance includes:
determining to correct the residual distance when the residual distance from the position of the vehicle received from the navigation device to the driving direction change point of the vehicle is determined to be less than the preset distance.

10. The method of claim 7, wherein the correcting the residual distance includes:
correcting the residual distance by adding a preset projected distance corresponding to the output height of the augmented reality image to the residual distance.

11. The method of claim 10, further comprising:
controlling to end a projection after projecting the augmented reality image at a position spaced apart by the preset projected distance from the position of the vehicle when the corrected residual distance is the preset projected distance.

* * * * *